United States Patent [19]

Nagashima

[11] 4,379,651

[45] Apr. 12, 1983

[54] METHOD FOR RELEASABLY RIGIDLY FASTENING TWO INTERSECTED OVERLAPPING METAL PROFILES AND MEANS THEREFOR

[76] Inventor: Masaya Nagashima, 4-6, Takayanagi 3-chome, City of Kisarazu, Chiba Prefecture, Japan

[21] Appl. No.: 207,407

[22] Filed: Nov. 17, 1980

[30] Foreign Application Priority Data

Jul. 7, 1980 [JP] Japan .................................. 55-91789

[51] Int. Cl.³ ........................... B25G 3/36; E04G 7/00
[52] U.S. Cl. ..................................... 403/387; 403/406; 403/384; 403/403; 248/228
[58] Field of Search ............... 403/387, 405, 406, 408, 403/403, 169–172, 399, 400, 384, 385; 248/228, 229, 72

[56] References Cited

U.S. PATENT DOCUMENTS

| 559,539 | 5/1896 | Reynolds | 403/400 |
|---|---|---|---|
| 729,445 | 5/1903 | Streeter | 403/387 |
| 2,507,783 | 5/1950 | Graham | 403/387 |
| 2,595,352 | 5/1952 | Graham | 403/387 X |
| 3,380,205 | 4/1968 | Ratchford | 403/400 X |
| 4,033,539 | 7/1977 | Bardocz | 403/387 X |
| 4,062,519 | 12/1977 | Jacobs | 248/228 X |

FOREIGN PATENT DOCUMENTS

| 7808 | of 1897 | United Kingdom | 403/387 |
|---|---|---|---|
| 1440709 | 6/1976 | United Kingdom | 403/387 |

Primary Examiner—Wayne L. Shedd
Attorney, Agent, or Firm—Amster, Rothstein & Engelberg

[57] ABSTRACT

A method and means for releasably rigidly fastening two standardized metal profiles intersected at an angle and lying one upon another are provided in which four L-shaped members each having two vertical sides are respectively applied at the respective corners of the intersection such that the outer faces of the respective sides of the L-shaped member abut against the respective edge portions of the metal profiles at the intersection lying one upon another and at the same time portions of the respective sides are made to protrude beyond the upper or lower surface of the metal profiles, whereby the confronting protruded portions of the sides of the L-shaped members are rigidly connected together by any suitable fastening means with the metal profiles being respectively interposed between the confronting sides, respectively.

4 Claims, 2 Drawing Figures

METHOD FOR RELEASABLY RIGIDLY FASTENING TWO INTERSECTED OVERLAPPING METAL PROFILES AND MEANS THEREFOR

BACKGROUND OF THE INVENTION

The present invention relates to a method for releasably rigidly fastening two members intersecting at an angle in an overlapping relationship, and more particularly to a method for releasably rigidly fastening two standardized metal beams such as metal H-beams or the like intersecting substantially at right angles and lying one upon another. The present invention relates also to fastening means adapted to be used for carrying out the method in accordance with the present invention.

For instance, when a bridge is to be erected, in general, first a temporary bridge for construction has to be erected for use as scaffolding, and the temporary bridge is disassembled and withdrawn after completion of the object bridge.

In such a case, it has hitherto been the general practice that two standardized steel beams such as metal H-beams or the like to be used as e.g. a temporary bridge are rigidly fastened together at a portion where they are intersected at an angle e.g. substantially at right angles in an overlapping fashion with bolts being passed through bolt holes previously formed in the H-beams, respectively, or rivetted or welded together with or without doubling plates being interposed therebetween. However, if such a procedure were adopted for the erection of e.g. a temporary bridge, or the like, since it is required to have the H-beams or the like disassembled and withdrawn once the bridge has been completed, one would encounter various inconveniences as exemplified below: it takes too long a time to assemble the beams, the disassembly thereof is troublesome, and the beams themselves become severely damaged as they are repeatedly used since they have to be subjected to some working each time they are used. Further, when one desires to change the position of intersection of the two beams the positions of the bolt holes, etc. previously formed also have to be changed accordingly, so in practise such a change is possible only within a very limited range.

The present invention aims at discarding all the inconveniences as outlined above which are encountered when two standardized beams such as metal H-beams are to be releasably rigidly fastened together at their intersected portion in an overlapping relationship. The present invention is particularly suitable for releasably rigidly fastening two standardized metal H-beams where they are intersected substantially at right angles in an overlapping relationship.

SUMMARY OF THE INVENTION

It is an object of the present invention to provide a method for releasably rigidly fastening two standardized metal beams such as metal H-beams or the like intersecting substantially at right angles and lying one upon another.

It is another object of the present invention to provide a method for releasably rigidly fastening two standardized metal beams such as metal H-beams or the like intersecting substantially at right angles and lying one upon another which allows easy release of the once fastened H-beams and also easy relocating of the intersection.

It is a further object of the present invention to provide fastening means adapted for carrying out the method according to the present invention.

In accordance with the present invention a method for releasably rigidly fastening two standardized metal beams such as metal H-beams intersecting at an angle, preferably substantially at right angles and lying one upon another which comprises the steps of applying at each corner of the intersection of the metal beams an L-shaped member having two vertical sides intersected substantially at right angles with its outer faces abutting against the flanges or the like of the metal beams so that at least a portion of the respective sides of the respective L-shaped members protrudes beyond the upper or lower surface of the metal beams, and releasably rigidly connecting the respective sides of the L-shaped members which protrude above or below the upper or lower surface of the metal beams so as to confront each other by any suitable means such as nut and bolt assemblies, with the metal beams disposed therebetween.

In accordance with the present invention means for rigidly fastening two standardized metal beams such as metal H-beams or the like intersecting at an angle, preferably substantially at right angles and lying one upon another are provided which comprises four L-shaped members each having two vertical sides intersected at an angle conforming to the respective angles made between the intersected metal beams at the respective corners, each of the L-shaped members further having the outer faces of the respective sides formed with grooves to receive the edge portions of the flanges or the like of the metal beams therein at the respective corners, and a number of fastening means such as nut and bolt assemblies adapted to rigidly connect the respective sides of the L-shaped members protruding above or below the upper or lower surface of the metal beams so as to confront each other.

According to one of the preferred features of the present invention the grooves in the sides of the L-shaped member are formed in two or more ribs respectively integrally formed on the outer faces of the sides in a direction parallel to the apex formed by the intersected sides.

BRIEF DESCRIPTION OF THE DRAWINGS

The above brief description as well as further objects, features and advantages of the present invention will be more fully appreciated by reference to the following detailed description of the presently preferred, illustrative embodiment according to the present invention when taken in conjunction with the accompanying drawings, wherein.

DESCRIPTION OF THE PREFERRED EMBODIMENT

Figure 1:
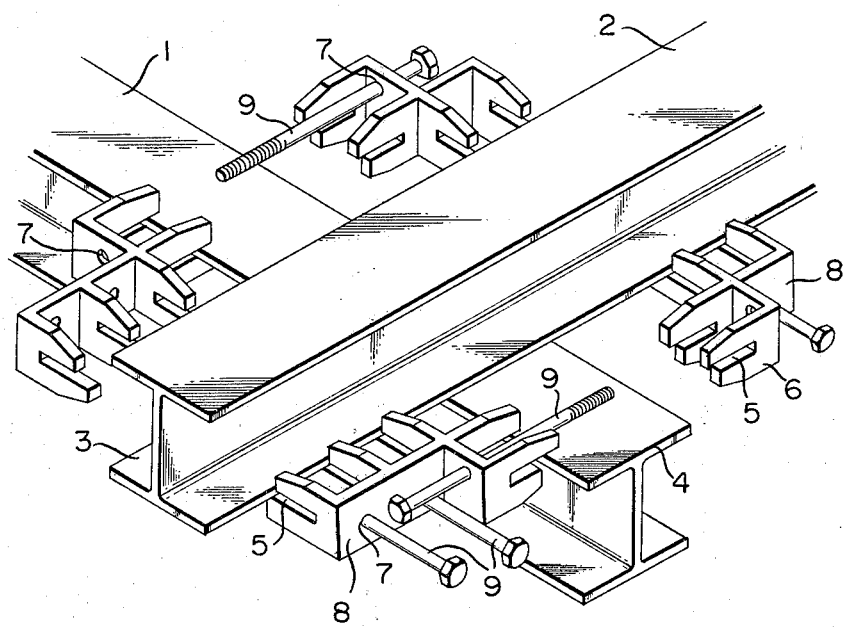
FIG. 1 is an exploded perspective view of the essential portion of two metal H-beams as examples of the standardized metal beams intersected substantially at right angles in an overlapping relationship together with fastening means according to the present invention prior to the fastening of the former by the latter.
Figure 2:
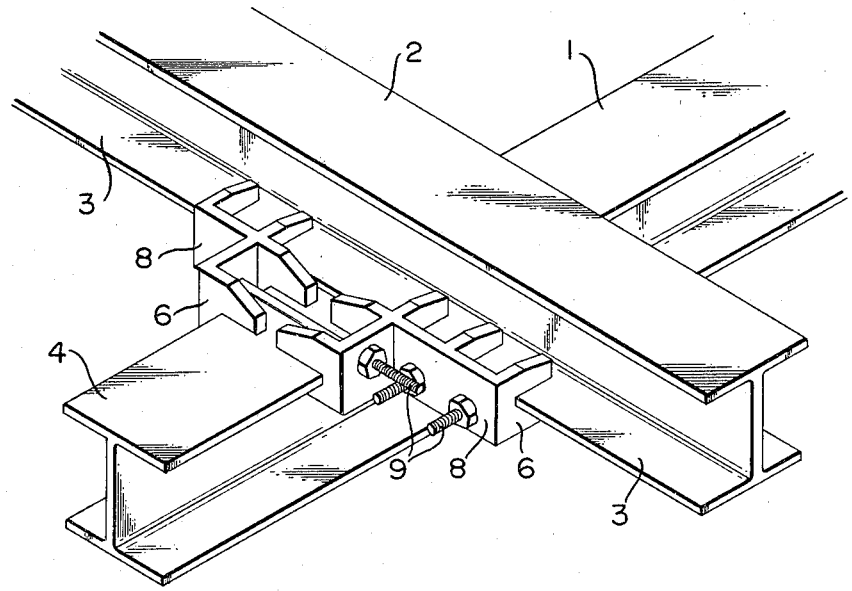
FIG. 2 is a perspective view showing the state of the H-beams shown in FIG. 1 after they have been rigidly fastened together by the fastening means also shown in FIG. 1.

Referring now to FIGS. 1 and 2 of the attached drawings, it is assumed that two standardized metal beams, e.g. standardized metal H-beams 1 and 2 are intersected at an angle, e.g. substantially at right angles with their upper and lower flanges 4 and 3, respectively, being laid one upon another and they are intended to be releasably rigidly fastened together. For this purpose, as a rule four clamps 8 are provided to be applied to the respective corners formed by the intersection of H-beams 1 and 2. Each of clamps 8 comprises a main body which has a generally L-shaped configuration in plan view so as to have two vertical sides elongating substantially at right angles from the apex, the angles respectively conforming to the angles made between H-beams 1 and 2 at the respective corners of their intersection, and two or three vertical ribs 6 integrally protruded from the outside faces of the sides, respectively, orthogonally thereto, whereby ribs 6 are preferably provided at each end, and, if necessary, additionally at the middle of the respective sides. Further, ribs 6 protruded vertically from the respective sides are formed with cutouts or grooves 5 formed orthogonally to their surfaces such that cutouts 5 can snugly receive the edge portions of lower flange 3 and upper flange 4 of intersected H-beams 2 and 1, respectively, when clamps 8 are respectively disposed at the respective corners of the intersection. In this case, since the positions of upper and lower flanges 4 and 3 relative to the body of clamp 8 differ from each other between the clamps to be disposed at the respective corners, in principle four clamps 8 each having a different configuration have to be prepared for each single intersection as shown in FIGS. 1 and 2, although clamps 8 to be disposed diagonally at the intersection may have similar configurations, if required. Further, the sides of clamps 8 are respectively provided with one or more bolt holes 7 so that one or more bolts 9 can be passed through bolts holes 7 of the confronting sides of clamps 8 above or below upper or lower flanges 4 or 3 of H-beams 1 or 2, and fixedly secured together by nuts screwed to bolts 9 projected from the faces of the sides of clamps 8.

Thus, it will be appreciated that when metal H-beams 1, 2 intersected at an angle e.g. substantially at right angles in an overlapped relation are to be releasably rigidly fastened together, firstly each of clamps 8 is held at the respective corners of the intersection of H-beams 1, 2 with grooves 5 formed in ribs 6, protruded from the outer faces of the respective sides of the body of clamp 8, being forced to receive the edge portions of upper or lower flange 4 or 3 of H-beams 1, 2 by giving an appropriate blow to the clamp body, and then the respective confronting sides of clamps 8 projected above or below upper or lower flange 4 or 3 of H-beams 1 or 2 are respectively fastened together by having bolt holes 7 formed in the sides of the body of clamps 8 passed through by bolts 9, respectively, whereby the free ends of bolts 9 are engaged by nuts as shown in FIG. 2. The numbers and dimensions of ribs 6 and bolts 9 can be suitably selected depending upon the strength of the temporary bridges, etc. required.

Although the fastening means according to the present invention has been described and shown as being utilized to fasten metal H-beams overlapping at an angle it will be appreciated that it may be utilized as well for fastening standardized metal beams other than H-beams, so long as they have plate-like edge portions elongating lengthwise similarly to the flanges of the H-beams.

From the foregoing it will be understood that by practising the present invention two intersected standardized metal beams can be rigidly fastened together at their intersected portion without the need for drilling bolt holes, or a welding operation, etc. which have hitherto been absolutely necessary, and at the same time the disassembly and withdrawal of the metal beams is made easy, causing no damage thereto, so their repeated use is possible.

A latitude of modification, change and substitution is intended in the foregoing disclosure and in some instances, some features of the invention will be employed without a corresponding use of the other features. Accordingly, it is appropriate that the appended claims be construed broadly and in a manner consistent with the spirit and scope of the invention herein.

What is claimed is:

1. A means for releasably rigidly fastening two metal beams intersecting at an angle and lying one upon another, consisting essentially of four L-shaped members each having two vertical sides intersected at one end of each so as to make an angle corresponding to the angle made at the respective corners of said intersection of said metal beams, said sides of each of said L-shaped members being formed on their outer faces with grooves respectively adapted to receive therein the respective edge portions of the lower and upper parts of said metal beams at said respective corners of said intersection, and a number of fastening means adapted to rigidly connect said sides of said L-shaped members protruding above or below said lower and upper parts of said metal beams so as to confront each other.

2. A means for releasably rigidly fastening two metal beams intersecting at an angle and lying one upon another as claimed in claim 1 wherein said outer faces of said sides of said L-shaped member are respectively provided with two or more vertical ribs so as to protrude orthogonally thereto, and said grooves are formed transversely in said ribs.

3. A means for releasably rigidly fastening two metal beams intersecting at an angle and lying one upon another as claimed in claim 1 or 2 wherein when said metal beams intersect substantially at right angles two pairs of said L-shaped members are provided, whereby each of said pairs comprises two of said L-shaped members of identical configuration.

4. A means for releasably rigidly fastening two metal beams intersecting at an angle and lying one upon another as claimed in claim 1, 2 or 3 wherein said fastening means is a nut and bolt assembly.

* * * * *